United States Patent [19]

Gerber et al.

[11] Patent Number: 4,583,181

[45] Date of Patent: Apr. 15, 1986

[54] FABRIC FLAW RELATED SYSTEM

[75] Inventors: Heinz J. Gerber, West Hartford; David J. Logan, Glastonbury, both of Conn.

[73] Assignee: Gerber Scientific, Inc., South Windsor, Conn.

[21] Appl. No.: 693,184

[22] Filed: Jan. 22, 1985

Related U.S. Application Data

[63] Continuation-in-part of Ser. No. 509,972, Jun. 30, 1983, abandoned.

[51] Int. Cl.[4] .......................... G06F 15/46; B26D 5/30

[52] U.S. Cl. ....................................... 364/470; 33/474; 83/71; 83/925 CC; 250/572; 356/238; 358/106; 364/475; 364/507

[58] Field of Search ........................ 364/470, 475, 507; 83/71, 74, 520, 521, 522, 925 CC; 358/101, 106, 107, 903; 250/571, 572; 26/70; 356/238; 33/474–481

[56] References Cited

U.S. PATENT DOCUMENTS

| | | | |
|---|---|---|---|
| 3,540,830 | 11/1970 | Di Canio | 356/238 |
| 3,541,243 | 11/1970 | Whitsel et al. | 83/520 X |
| 3,769,488 | 10/1973 | Hasslinger | 364/470 X |
| 4,176,566 | 12/1979 | Patterson et al. | 83/925 CC X |
| 4,178,820 | 12/1979 | Gerber | 83/925 CC |
| 4,223,346 | 9/1980 | Neiheisel | 250/572 X |

*Primary Examiner*—Joseph Ruggiero
*Attorney, Agent, or Firm*—McCormick, Paulding & Huber

[57] ABSTRACT

The disclosed system assists an operator in dealing with flaws encountered during the spreading of web material to be cut in accordance with a marker stored in a computer memory. Information representing the location of the flaw is processed by a computer in conjunction with the marker information to yield results visually displayed to the operator concerning the seriousness of the fault's location and corrective action to be taken if the flaw does fall at a troublesome spot. The flaw location representation may be made by manual measurements entered into the system by way of a keyboard or may be made semi-automatically through a two-dimensionally encoded pointer. The visual display may give the operator information concerning a patch or concerning stop and restart lines for making a splice or may display a portion of the marker in the vicinity of the flaw. The display may be digital or pictorial and, if pictorial, may be made on a display area separate from the material web or may be projected directly onto the material web.

46 Claims, 24 Drawing Figures

FABRIC FLAW RELATED SYSTEM

CROSS-REFERENCE TO RELATED APPLICATION

This application is a continuation-in-part of application Ser. No. 06/509,972, filed on June 30, 1983 abandoned.

BACKGROUND OF THE INVENTION

This invention relates to the spreading of web material which is subsequently to be cut, usually automatically, in accordance with a marker defined by information stored in a computer memory, and deals more particularly with a system for assisting a spreader operator in dealing with flaws encountered during the spreading of the web material.

The system of the invention may be used in various different industries where material is to be cut in accordance with predetermined markers to create pattern pieces subsequently joined by sewing or other means to produce finished articles. In the garment making industry, for example, textile webs are conventionally spread on a spreading table to form a multiple layered layup and such layup is thereafter worked on by a cutting machine controlled by stored marker information to cut out bundles of pattern pieces. Such automatically controlled cutting machines are shown for example by U.S. Pat. Nos. 3,887,903; 4,133,235, and Re. 30,757. In some cutting and spreading operations, flaws are not taken into account during spreading and if they thereafter appear in pattern pieces, such pieces are used to make second or irregular grade articles. However, in other spreading and cutting operations, an attempt is made to deal with flaws so that every bundle of pattern pieces includes an equal number of good pieces allowing all of the finished articles to be of first quality without any seconds or irregulars being produced.

The material spread may be preinspected in which case flaws are marked in some way, such as by circling with chalk and/or applying a marking clip or tag to the edge of the material, to make them readily apparent to the spreader operator. Other times, the material may not be preinspected in which case the spreader operator visually inspects it as it is spread or the spreading machine may include a device for automatically inspecting the material as it is spread and for providing an indication when a fault is encountered.

If the spreader operator has only limited information available to him concerning the marker, he may have to assume that every flaw falls in a troublesome or unacceptable area of the material requiring him to take some corrective action for every flaw, and the corrective action to be taken is usually quite wasteful of the material. As an alternative, the operator when encountering a flaw may stop the spreading operation and lay a paper drawing of the marker over the layup to determine whether the flaw falls in an acceptable or unacceptable portion of the marker and to decide on a way of dealing with the flaw which is most economical of material if the flaw falls in an unacceptable location, but this use of a paper marker is quite time consuming and inefficient. It is therefore desirable that some means be provided for quickly correlating the location of a flaw to the marker to be cut from the material and from such correlation giving the operator information assisting him in deciding whether the flaw is troublesome and telling him how to deal with it if it is troublesome.

Prior U.S. Pat. Nos. 3,540,830 and 4,176,566 show two arrangements for providing flaw handling assistance to a spreader operator. In both of these disclosures, use is made of a transparent film strip containing a reproduction of the associated marker. The film strip is advanced with the web material as it is spread and is used with a projector which projects a portion of the film strip onto the material web in such a way as to produce on the material web a pictorial representation showing images of the pattern pieces to be cut from the web which images register with the pieces as they are subsequently cut from the web. Such systems, however, require the costly making of the film strips and rely on precise mechanical advancement of the film strip with the spreading of the material which precise mechanical advancement is difficult to maintain.

The general object of the invention is, therefore, to provide a system for assisting a spreader operator in dealing with flaws which system is one which may be implemented in various different ways depending on the requirements of its application and which, if desired, may be implemented in a very inexpensive way, all implementations using a computer memory resident marker representation, which memory resident marker representation may be the one also used to control the automatically controlled cutting machine driving the subsequent cutting operation, so that no additional marker representation need be prepared for the flaw handling system. The invention further aims at providing a flaw handling system which is otherwise an improvement over those shown by the two above mentioned patents with regard to cost, accuracy, versatility, ease of operation and other factors.

A further object of the invention is to provide a system of the foregoing character whereby through the use of a computer, the spreader operator may be provided with information defining the optimal way, insofar as saving of material is concerned, to deal with a flaw.

Other objects and advantages of the invention will be apparent from the following detailed description of the preferred embodiments and from the accompanying drawings.

SUMMARY OF THE INVENTION

The invention resides broadly in a flaw handling system consisting of a spreading table on which cloth to be cut is spread, a means providing a computer memory resident marker representation, a means providing a flaw location representation, and a display means responsive to the two representations providing a visual display useful to an operator in dealing with a flaw.

In its more detailed aspects, the invention further resides in the means responsive to the two representations including a computer which processes the flaw location representation and the marker representation to provide information to the visual display. The displayed information may be in digital or pictorial form and may be information concerning a patch, information concerning the location of stop and restart lines, or other useful information.

In one species, the invention resides in the flaw location representation being provided by means of a manual measuring device, such as a scale attached to the spreading table for measuring longitudinal (X) coordinates and a T-square for measuring transverse (Y) coordinates, and a keyboard for entering the manually measured coordinates into the system's computer.

In another species, the invention resides in the means providing a flaw location representation including a manually positioned pointer associated with X and Y encoders which automatically input flaw location information into the computer.

The invention, in another species, also specifically resides in the means providing the flaw location representation including a vidicon supported above the spreading table and movable in a longitudinal direction or longitudinal and transverse directions to permit it to be vertically registered with a detected flaw.

Also, the invention resides in the display means possibly being a projector which projects a portion of the marker, obtained from the computer memory, onto a flaw containing portion of the material being spread.

The invention also resides in various other details of the system expressed in the claims.

DETAILED DESCRIPTION OF THE PREFERRED EMBODIMENTS

Figure 1:
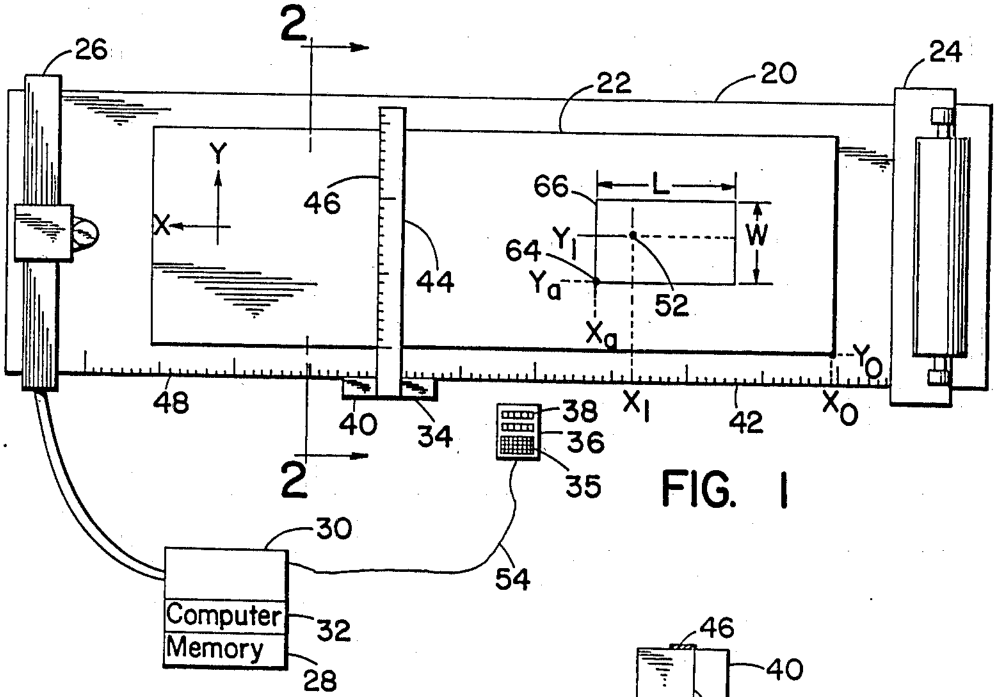
FIG. 1 is a plan view, somewhat diagrammatic, of a spreading and cutting table having associated with it a flaw handling system the present invention.
Figure 2:
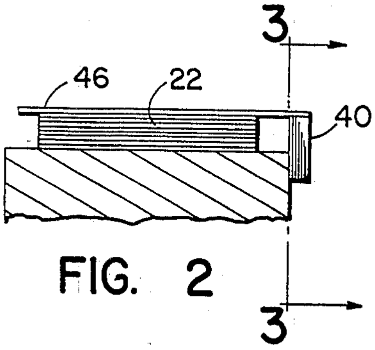
FIG. 2 is a vertical sectional view taken on the line 2—2 of FIG. 1.

Turning to FIG. 1, a system embodying the invention is there shown in association with a table 20 on which lengths of a web material may be spread, one on top of the other, to create a layup 22 which is subsequently cut to provide bundles of pattern pieces. The illustrated table 20 is taken to be both a spreading and a cutting table. That is, it is usable both with a spreader 24 for spreading the material and with an automatic cutter 26 for subsequently cutting the material. However, such dual function of the table is not essential to the invention and if desired, the table in question may be merely a spreading table with the web material, after its having been spread, being subsequenty transferred to another table or location for cutting. In either event, the spread material, as represented by the layup 22, is when cut, cut in accordance with a predetermined marker a representation of which is stored in a computer memory. Such a computer stored marker representation may be one such as described by previously mentioned U.S. Pat. No. 3,803,960 or U.S. Pat. No. 3,887,903. Generally, such memory resident marker representation is used to control an automatic cutter and in FIG. 1, a memory containing such a representation is indicated at 28 and forms a part of a controller 30, including a computer 32, which controls the cutter 26.

In accordance with the invention, the flaw handling system includes the spreading table 20, the computer 32 and the marker representation stored in the memory 28. In addition, it further includes a means for providing a representation of the location of a detected flaw which flaw location representation is then processed by the computer 32 with the marker representation to provide information useful to the spreader operator, and a means for visually displaying such information to the operator. The means providing the flaw location representation and the visual display means may vary widely and may involve widely different degrees of cost, complexity, and level of displayed information.

In FIG. 1, the illustrated flaw recovery system utilizes components making the overall system a relatively inexpensive and simple one. More particularly, the means for providing a representation of the location of the flaw consists of a T-square 34 and a keyboard 35 of a portable terminal 36. The face of the terminal 36 is shown in more detail in FIG. 4 and, in addition to the keyboard 35, includes a visual display 38.

The T-square 34 has a head 40 adapted to be placed flatly against one side edge 42 of the table 20 and an elongated arm 44 is attached to the head 40. The arm 44 is fixed to the head 40 in such manner as to extend transversely, or in the illustrated Y-direction, across the table 20 and the material spread thereon, when the head 40 is flatly engaged with the table edge 42 as shown in FIG. 1. The arm 44 further has a graduated scale 46 along one edge thereof, which may be read to provide the Y-coordinate or Y-coordinates of points representing a detected flaw. That is, flaws may be of a number of different kinds, and depending on what kind of flaw is involved the coordinates of one or more points, and possibly other digital information may be used to represent it. For example, if the flaw is fairly small and point-like the coordinates of a single point alone may be used to represent it. If the flaw is larger but of a generally circular shape it may be represented by the coordinates of its center point and a number representing its diameter or radius. If the flaw is essentially a line extending parallel to or transversely of the web it may be represented by the coordinates of its two end points, or possibly by the coordinates of one of its end points along with a number representing its length and another bit or number indicating whether the line is a longitudinally or transversely extending one. If the flaw extends over an irregularly shaped area the coordinates of a number of points defining the periphery of the area may be used to represent it.

Figure 3:
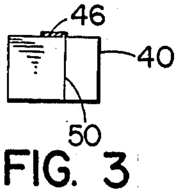
FIG. 3 is a vertical sectional view taken on the line 3—3 of FIG. 2.

Also, the table 20 in the vicinity of the edge 42 has a graduated scale 48 extending along the length of the table, which may be read with the T-square 34 to provide the X-coordinate or X-coordinates of points representing the detected flaw. The table scale 48 may be provided in various different ways and, for example, may consist of graduations and numbers painted directly onto the table or may consist of a separate steel tape or the like fastened to the table edge. As shown in FIG. 3, the inside face of the T-square head 40 includes a reference line or groove 50 which may be used for reading the scale 48. However, some other type of reference mark or pointer carried by the T-square may be used to read the scale 48, if desired. The T-square 34 is separate from the table 20 and may be set to one side when not in use. In some cases, a simple tape measure or folding rule may be used by the operator in place of a T-square to make the coordinate measurements.

When a flaw is encountered in a layer of material being spread on the table 20, the spreading is temporarily interrupted and the T-square 34 is placed adjacent a point related to the flaw, the scales 46 and 48 are read to determine the point's X and Y-coordinates, and these coordinates are then input to the computer 32 through the keyboard 35 of the terminal 36. If the coordinates of other points are needed to represent the flaw these are taken and input to the computer in the same way.

To provide useful output information, the computer 32 also needs to know the position of the layup 22 or other spread material relative to the table surface. In FIG. 1, the illustrated lower right hand corner of the layup 22 is taken to be its reference point, and the coordinates ($X_0$, $Y_0$) of this point are supplied to the computer to define the position of the layup relative to the table. In some cases, every layup spread on the spreading table may have the same reference coordinates, in which case, such reference coordinates can be stored permanently in the computer and need not be supplied with every new layup. However, in other cases such reference position shifts from layup to layup so that its coordinates need be supplied to the computer with each layup. When this is the case, the reference coordinates may be provided by using the T-square 34 and the scale 48 to manually determine their values, which values are then entered into the computer through the keyboard 35.

By way of illustration, in FIG. 1 a point-type flaw in the top layer of the layup 22 is shown at 52. After this flaw is encountered, the spreading is terminated before the flaw becomes covered by the next spread layer. This means that the spreader 24 may be stopped shortly after the flaw 52 is laid down or, alternatively, after the flaw 52 is laid down the spreader may continue to spread the involved layer and then the spreading is stopped and not started again until all of the flaws in the involved layer have been attended to.

In attending to the flaw 52 the operator manually reads its coordinates ($X_1$, $Y_1$) using the T-square 34 and the scales 46 and 48 and after having obtained these coordinates enters them into the terminal 36 through the keyboard 35. From the keyboard 35 the coordinate information is transmitted to the computer 32. This transmission may take place in various different ways as through a cable 54 connecting the terminal to the computer. However, if desired, wireless transmitting and receiving means may be used in both the terminal 35 and the controller 32 to transmit information back and forth between the terminal and the controller to make the terminal free of wire connections and more easily portable. The computer 32 is suitably programmed so that after it receives the information defining the coordinates of the flaw 52 from the terminal 36, together with additional instructions entered through the keyboard 35, it processes the flaw location information together with the marker representation stored in the memory 28 to provide information useful to the operator.

Figure 4:
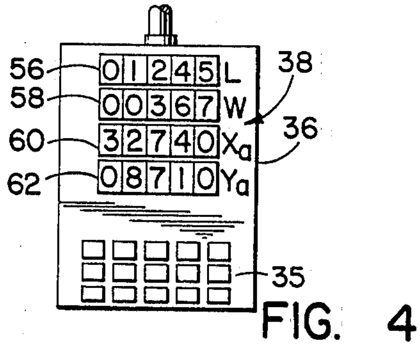
FIG. 4 is an enlarged plan view of the operator's visual display and keyboard terminal of the system of FIG. 1.

In the FIG. 1 embodiment the information provided to the operator concerning a detected flaw consists first of all of an indication telling the operator whether the flaw falls at such a location on the spread material as to be troublesome and require some corrective action. Secondly, if the flaw location is troublesome, the operator is further provided with information concerning the dimensions and location of a patch to be applied over the material layer containing the flaw. As shown in FIG. 4 the visual display 38 providing the displayed information includes four separate displays 56, 58, 60, and 62 each displaying a multiple digit number. The display 56 provides a number describing the length of the required patch, the display 58 provides a number defining the width of the required patch, the display 60 provides a number defining the X-coordinate ($X_a$) of one reference corner 64 of the patch 66 and the display 62 provides a number defining the Y-coordinate ($Y_a$) of the reference patch corner 64. If the computer determines that the flaw 52 falls in a non-troublesome spot, the displays 56 and 58 for the length and the width of the patch may both display zeros, but if desired some separate indicator may be provided on the terminal 35 to further indicate the non-troublesome nature of the flaw location. If the flaw location is troublesome, the corrective action taken by the operator is to cut a patch of a size dictated by the length and the width dimensions displayed by the displays 56 and 58 and to then place the patch on the spread material with its reference corner 64 at the location given by the displays 60 and 62, and in doing the latter use may again be made of the T-square 34 and scale 48.

Figure 5:
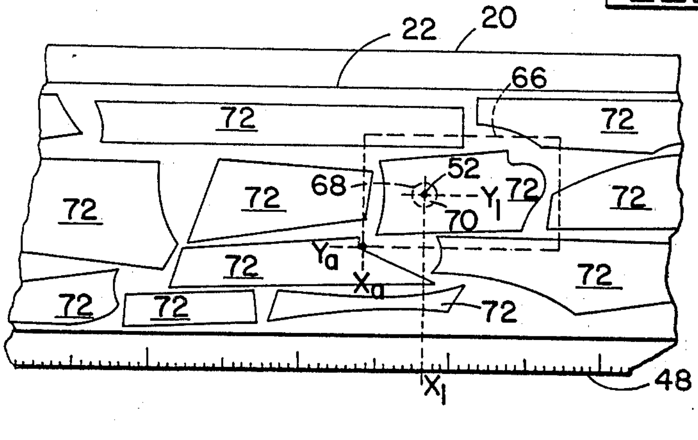
FIG. 5 is a fragmentary plan view of the spreading and cutting table of FIG. 1 showing in more detail the operation of the flaw handling system.

FIG. 5 shows further the process undergone by the computer 32 in generating information concerning a flaw such as the illustrated point-like flaw 52. After receiving the coordinate information defining the coordinates ($X_1$, $Y_1$) of the flaw 52, the computer first preferably draws a closed line around the flaw, such as the illustrated circular line 68, to create a flaw zone 70 taking into account various tolerances or errors which may be involved. That is, between the time of spreading and cutting the material may shift or spread slightly so that the flaw when the material is cut may not be at the same location as occupied during the spreading and correcting procedure. An expansion of the flaw location by the closed line 68 takes such possibilities into account. Instead of expanding the size of the flaw to allow a tolerance, the size of the pattern pieces of the marker could also be increased for the same purpose by adding an outboard offset to all pattern piece lines. Also, since the maximum expected error in the longitudinal direction of the web may be greater than the maximum expected error in the transverse direction, the expansion of the flaw (or of the pattern pieces) may be greater in the longitudinal direction than in the transverse direction.

The computer then compares the flaw zone 70 with the marker representation (or the non-expanded flaw location with the expanded pattern pieces). In FIG. 5 the pattern pieces 72, 72 of the marker appearing in the vicinity of the flaw 52 are shown superimposed on the top surface of the layup 22. If the flaw zone 70 is found to fall not wholly or partially within any of the neighboring pattern pieces 72, 72, it is declared nontroublesome by the computer and an appropriate indication is made to the operator through the visual display of the terminal 36. In FIG. 5, however, the flaw 52 falls within one pattern piece 72 and in this case the computer computes the dimensions and location of the patch required, as indicated by the broken lines of FIG. 5. Of course, if the flaw zone 70 were to intrude into two or more adjacent pattern pieces, the patch would have to be of a sufficient size to cover all such involved pieces.

In the illustrated case it is taken that the intrusion of the flaw zone into any pattern piece requires that that pattern piece be covered by a patch. However, the computer could also be programmed to make some value judgment or analysis in deciding whether a pattern piece, when intruded into by the flaw zone, has to be covered by a patch. For example, each pattern piece or portion of a pattern piece could have some value associated with it identifying it as an important or unimportant part or portion and therefore the decision on whether or not to require a patch could be made in accordance with the value assigned to the pattern piece or portion of pattern piece into which the intrusion is made. For example, pattern pieces which are normally not visible in a finished garment may be designated as unimportant and no patch required when a flaw zone falls or intrudes into such piece.

Figure 21:
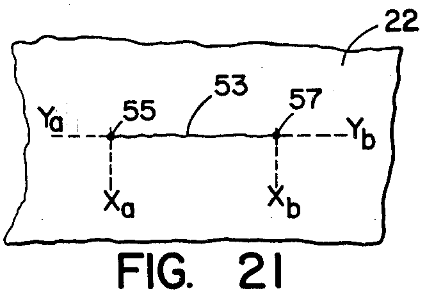
FIGS. 21, 22, and 23 are fragmentary plan views of a portion of a spread web material showing other types of flaws which may be encountered.

In FIG. 1 and some other figures, the flaw 52 has been taken for convenience of illustration to be one occurring in a very small area of the web material so as to be in essence a nondimensional or point type flaw. In many other cases, as already mentioned, the flaw has some dimension or dimensions which have to be defined as part of the flaw location information supplied to the computer. For example, the flaw may sometimes be in the form of a transverse or longitudinal line, such as produced by a pulled thread, or may be one occupying a generally round area or a more irregularly shaped area. By way of further explanation, FIG. 21 shows a line type flaw 53, the location of which may be supplied to the computer 32 by measuring the coordinates ($X_a$, $Y_a$) and ($X_b$, $Y_b$) of its end points 55 and 57, which are then input into the computer through the keyboard of the operator's terminal or by the encoders hereinafter described. Also, of course, the keyboard of the operator's terminal includes keys, or some other equivalent means is provided, to identify to the computer the type of flaw involved; that is, to tell the computer whether the coordinate information being entered relates to a point type flaw, a line type flaw, a round type flaw, an irregularly shaped flaw, or some other recognized type of flaw.

Figure 22:
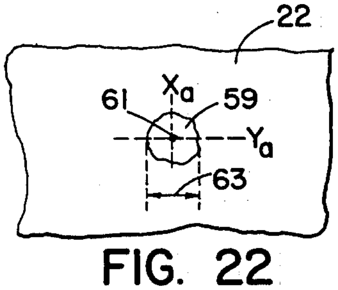

FIG. 22 shows a round type flaw 59, in which case the flaw location information supplied to the computer may be the coordinates ($X_a$, $Y_a$) of its center point 61 and a number representing the length of its diameter 63.

Figure 23:
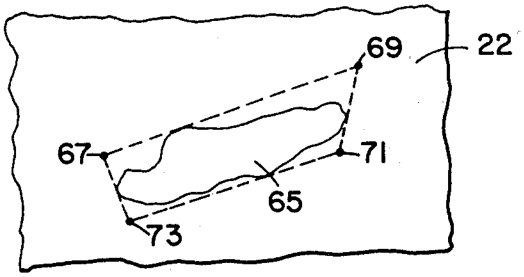

FIG. 23 shows an irregularly shaped flaw 65, in which case the flaw location information supplied to the computer may be the coordinates of the corners of a polygon drawn around the flaw, such as the coordinates of the corners 67, 69, 71, and 73 of the illustrated four-sided polygon. Again, of course, the computer would also be supplied, as through the keyboard 35, with instructions telling it that the entered information is to be interpreted as representing such corner locations.

Figure 8:
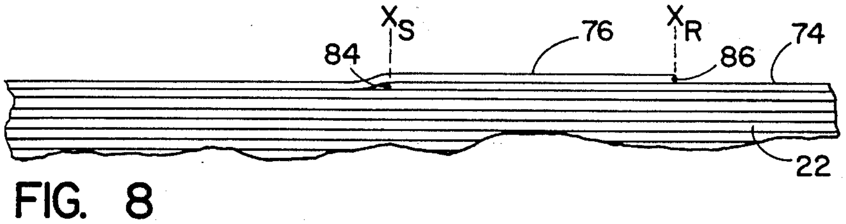
FIG. 8 is an enlarged fragmentary longitudinal vertical sectional view taken through a spreading table showing a splice made by cutting and overlapping the top layer of the material web.
Figure 9:
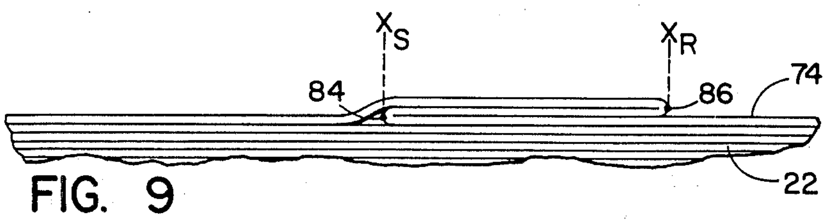
FIG. 9 is a view similar to FIG. 8 but showing a splice made by folding the material without cutting it.

Instead of applying a patch to the web material to deal with a troublesome flaw, other corrective measures may be taken and, if so, the program of the computer 32 and of the design of the operator's terminal 36 is such as to supply appropriate information to the operator. For example, FIGS. 6–9 relate to a situation in which the web material is spliced to correct for a flaw. Two types of splices are shown by FIGS. 8 and 9, in both of which cases it is assumed the spreader in spreading the top layer 74 of the web material moves from right to left. In FIG. 8, the splice is a cut one wherein the spreading stops at a stop line 84, having the longitudinal coordinate $X_S$, at which the material is cut. The cut end 76 is then pulled back to a restart line 86, having the longitudinal coordinate $X_R$, and the spreading restarted. In the fold splice of FIG. 9, the spreading is again stopped at the stop line 84 and restarted at the restart line 86, but the material, instead of being cut at the stop line, is folded upon itself as shown. If flaws are to be corrected by splicing, as shown in FIG. 8 or FIG. 9, the information supplied to the operator is information defining the location of the start and stop lines relative to the cutting table.

Figure 6:
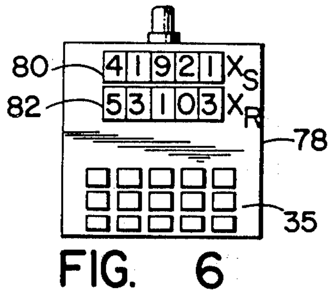
FIG. 6 is a plan view of operator's terminal which may be used in place of that of FIG. 1 in a system otherwise generally similar to that of FIG. 1.
Figure 7:
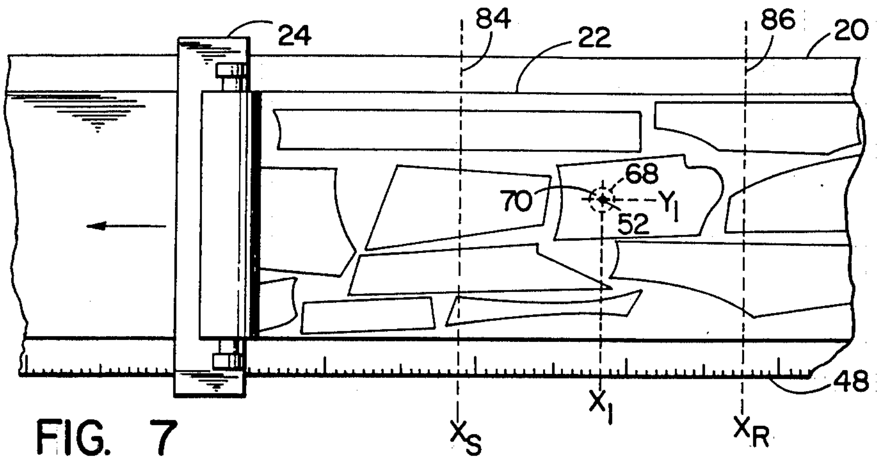
FIG. 7 is a fragmentary plan view of a cutting and spreading table showing in detail the operation of the system using the visual display of FIG. 6.

FIG. 6 shows an operator's terminal 78 which may be substituted for the terminal 36 of FIG. 1 with the terminal 78 including a keyboard 35 and a visual display consisting of two separate displays 80 and 82 for displaying digits representing a the location of a stop line 84, as shown in FIG. 7, and a restart line 86. That is, in using the terminal 78, the operator, when for example encountering a point-type flaw 52, measures the coordinates ($X_1$, $Y_1$) of the flaw and enters them into the remainder of the system through the keyboard 35 of the terminal 78. The computer then processes this coordinate information in conjunction with the marker representation stored in the memory 28 and provides an output digit on the display 80 representing the longitudinal coordinate $X_S$ of the start line 84 and another digit on the display 82 representing the longitudinal coordinate $X_R$ of the restart line 86. Both of these lines may then be located on the table by the operator using the scale 48 and can then be used by him to make a splice such as the cut one shown in FIG. 8 or the folded one shown in FIG. 9.

The systems described above using operator terminals having keyboards for entering manually obtained flaw location measurements and having digital displays for providing patch or splice information are ones which may be made at relatively low cost and yet be of considerable aid in saving material and spreading time. However, by using more complex components, systems having further efficiencies may be achieved.

Figure 10:
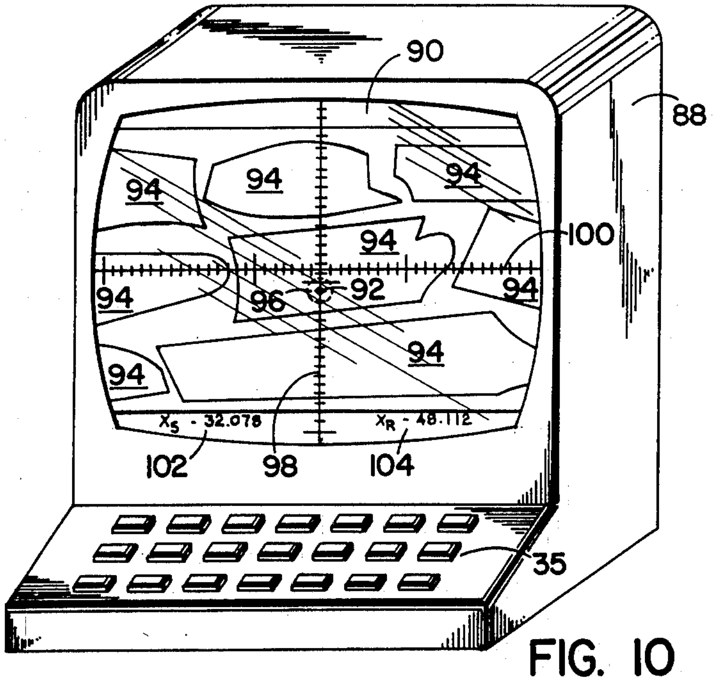
FIG. 10 is a perspective view showing an operator's terminal which may be used in place of the one of FIG. 1.

For example, referring to FIG. 10, an operator's terminal, such as the one indicated at 88, may be substituted for the terminal 36 of FIG. 1. This terminal 88 includes a keyboard 35 for entering manually derived flaw location measurements. However, in place of or in addition to the digital displays, it includes a cathode ray tube 90 providing a pictorial display. That is, after the coordinates of a flaw location are entered into the keyboard 35, the computer processes this information in conjunction with the stored marker representation and provides information to the CRT causing it to display a representation 92 of the flaw and representations 94, 94 of the pattern pieces of the marker located in the vicinity of the flaw. A tolerance zone 96 surrounding the flaw representation 92 also is shown. By using this pictorial display, along with graduated scales 98 and 100 on the cathode ray tube 90, the operator can determine whether the flaw requires corrective action and if so, can determine what such action to take. For example, by viewing the tube, he can determine what size patch may be required and where such patch should be located relative to the flaw. In addition to the pictorial display, the terminal 88 may also give a digital display. In FIG. 10, such an additional digital display, as at 102 and 104, is provided on the screen of the CRT tube 90, along with the pictorial display. However, separate display devices could be provided elsewhere on the terminal 88 for the additional digital readouts.

Figure 11:
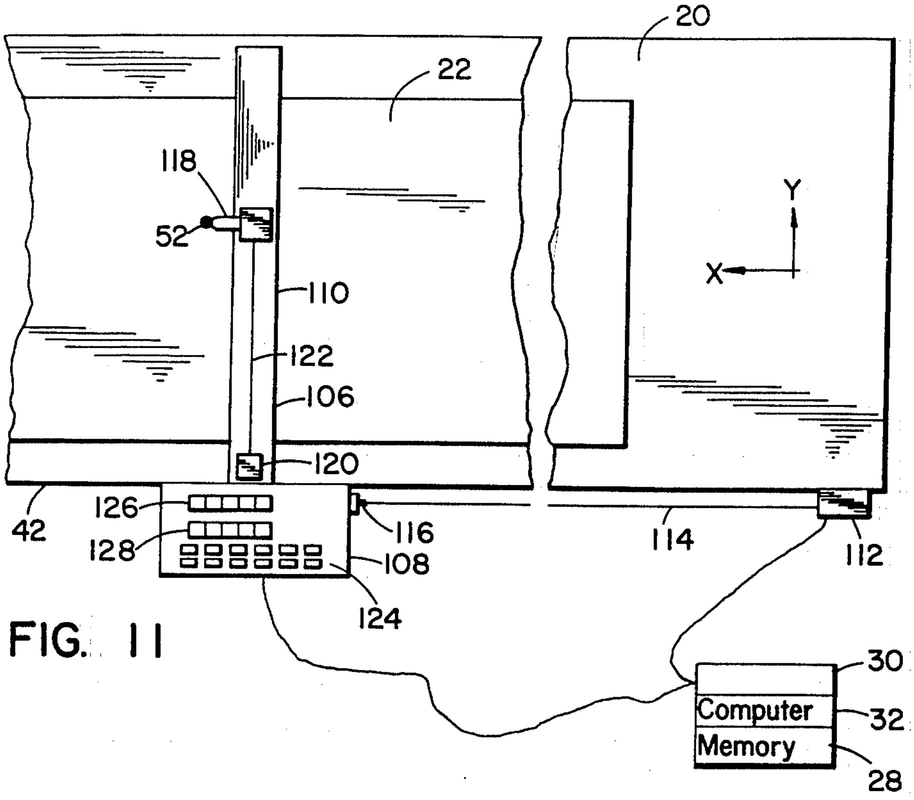
FIG. 11 is a fragmentary plan view of a cutting table showing a flaw location determining device having X and Y encoders for automatically supplying flaw location information to the system.

Instead of flaw location measurements being made manually, some means may be provided for encoding or digitizing such measurements to have them more easily entered into the computer. Such an arrangement is shown in FIG. 11 wherein flaw location measurements are made by a T-square 106, having a head 108 and an elongated arm 110. The T-square is separate from the table 20, but the head 108 is adapted to slidably engage the longitudinal side edge 42 of the table and when the head is so positioned, the arm 110 extends transversely across the layup 22. The head 108 is connected to an X-coordinate encoder 112 through a flexible cable 114 and a releasable connection 116, with the encoder 112 including a reel for the cable 114 and a spring mechanism for biasing the reel in the winding direction. The arm 110 of the T-square supports a pointer 118 for sliding movement along the length of the arm and the pointer is connected to a Y-coordinate encoder 120, similar to the encoder 112, through a cable 122.

The T-square head 108 further includes a keyboard 124 for entering instructions supplied to the computer 32 and a visual display for displaying digital information supplied from the computer 32. The visual display may take various forms, but in the illustrated case, consists of two separate displays 126 and 128 for respectively displaying digits locating the stop and restart lines for a splice. It will therefore be understood from FIG. 11 that when a point-type flaw 52 is encountered, the T-square is placed in proper position relative to the table, the cable 114 is connected to the head 108 and the T-square and pointer 118 are moved to cause the pointer to register with the flaw. The encoders are then read by the computer, as a result of an instruction to do so entered through the keyboard 124, and the computer then processes such coordinates in conjunction with the marker representation stored in the memory 28 to provide information to the operator displayed on the displays 126, 128. If the flaw is of such a nature as to require the taking of more than one point to provide a representation of it, the coordinates of all such points are first taken and entered into the computer in the same way and then the computer processes all such coordinate information in conjunction with the marker representation in the memory to provide information for the operator.

Figure 12:
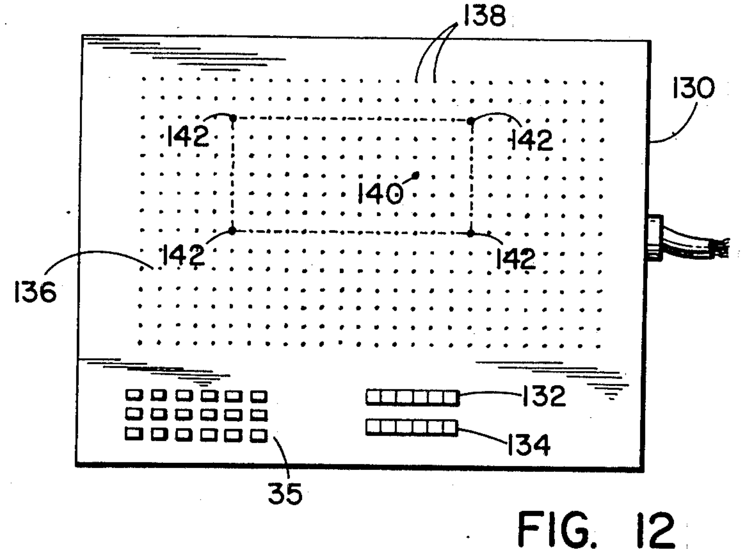
FIG. 12 is a plan view of another operator's terminal which may be used in place of the one shown in FIG. 1.

FIG. 12 shows another terminal which may be substituted for the terminal 36 of FIG. 1 and which provides a form of pictorial display in place of or in addition to the digital display of the terminal 36. The terminal in question is indicated at 130 and in addition to a keyboard 35 and two displays 132 and 134 for displaying digital information, includes a display in the form of a generally flat area 136 having uniformly distributed thereover in rows and columns a large number of two-state devices selectively switchable between their two states to create a shape on the area 136. The two-state devices may take various different forms, but preferably each is a light source, such as a light emitting diode (LED) 138 switchable between a light-emitting and a non-light-emitting state. The spacings between the LED's 138, 138 is related to the spacings between equivalent points on the table 20 on some reduced scale, such as a 5 to 1 scale. After the coordinates representing the location of a detected flaw are fed to and processed by the computer 32, the computer feeds back information to the terminal 130 causing at least one LED, such as the one indicated at 140, to be lighted to represent the flaw and causing four other LED's to be lighted, such as the one indicated at 142, 142, representing the locations of the corners of a patch to be applied to the material. The remainder of the LED's are unlighted. Therefore, by observing the lighted LED's 140 and 142, 142, the operator can see the size of patch required and its location relative to the flaw, thereby enabling him to properly cut and place the patch.

Figure 13:
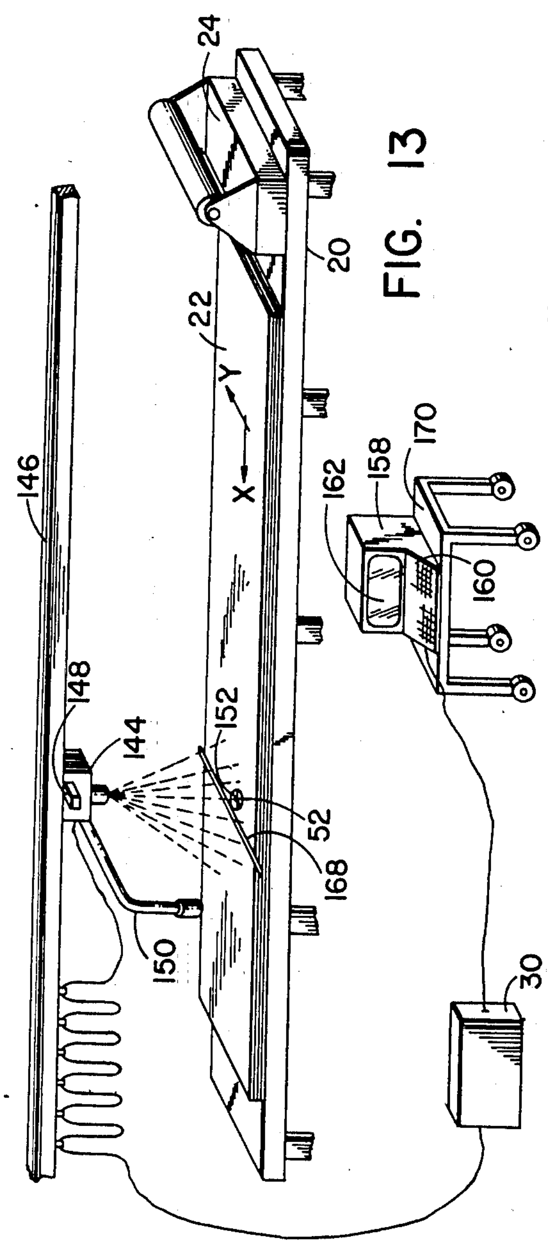
FIG. 13 is a perspective view, somewhat diagrammatic, showing a spreading table having associated with it a flaw handling system comprising another embodiment of this invention.
Figure 14:
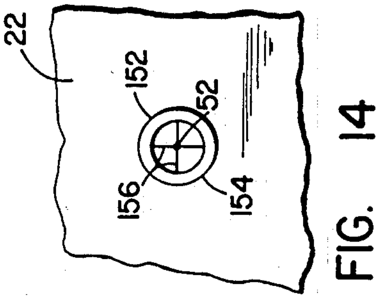
FIG. 14 is an enlarged fragmentary plan view showing a flaw marker which may be used with the system of FIG. 13.

FIG. 13 shows another embodiment of the invention wherein the flaw location representation is provided by a vidicon 144 located above the table 20 and supported for movement longitudinally of the table by a rail 146 with the longitudinal position of the vidicon being encoded by an encoder 148. Attached to the vidicon is a handle 150 for use by the operator in bringing the vidicon to a location above a detected flaw such as the point-type flaw indicated at 52. To make the flaw more visible, in the case of a point-type flaw, the operator may place over it a marker 152, such as shown in FIG. 14, consisting of a circular band 154 and two crosshairs 156, 156. The marker 152 therefore not only makes the flaw more visible to the vidicon, but its circular band 154 can be used to define a tolerance zone surrounding the flaw 52, thereby relieving the computer of the task of generating such a zone. Also included in the system of FIG. 13 is an operator's terminal 158 including a keyboard 160 and a cathode ray tube 162 for providing a pictorial display.

Figure 15A:
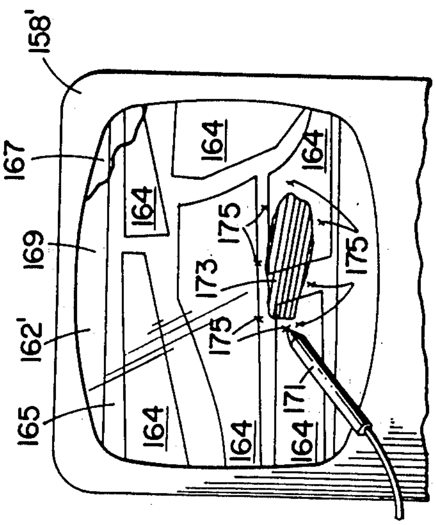
FIG. 15A is a view similar to FIG. 15 but showing an alternate display device which may be substituted for that of FIG. 13 to form another embodiment of the invention.
Figure 15:
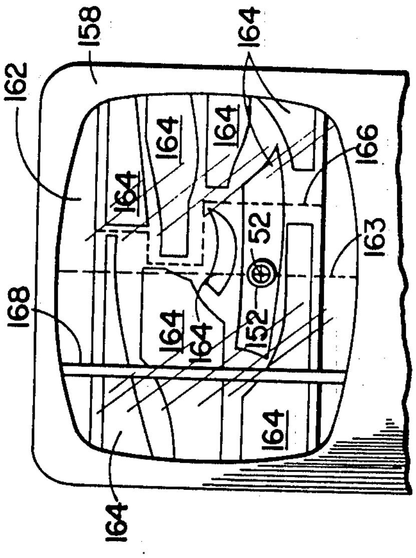
FIG. 15 is a view showing a typical display produced by the display device of FIG. 13.

In the use of the system of FIG. 13, when a flaw 52 is detected, the operator moves the vidicon 144 by means of the handle 150 to a position generally above the flaw. The encoder 148 then provides a representation of the flaw location to the computer of the controller 30 which processes such information in conjunction with the stored marker representation to provide a display on the screen of the CRT tube 162, such as shown in FIG. 15, pictorially showing the pattern pieces of the marker in the vicinity of the flaw. Also shown is a picture of the flaw 52 and of the flaw marker 152, if used. In other words, the cathode ray tube 162 shows pictorially the area viewed by the vidicon 144 as well as the related area of the marker with both images being superimposed on one another. Therefore, whatever appears on the viewed area will appear on the CRT and the operator may, for example, by viewing the CRT, draw a line, such as the one indicated for example at 166 in FIG. 15 on the top surface of the layup to describe a line of cut for making a splice with the utmost saving of material. If only a straight line of cut is to be made, the operator may find it convenient to use a rod or other straight edge 168 placed across the layup in the field of view of the vidicon. Then, by viewing the rod 168 on the CRT, as shown in the FIG. 15, the operator can move it back and forth until the best line of cut is found from the CRT. The material is then cut or folded along the line defined by the rod to make the splice. Such use of the rod is not, however, required, and in a perhaps preferred case the computer computes the optimal way of dealing with the flaw and causes such solution to be displayed to the operator on the operator's terminal through the CRT and/or other display devices of the terminal.

In the system of FIG. 13 the encoder 148 provides the longitudinal or X-coordinate of the flaw 152, or other point of interest, if the vidicon 144 is so positioned longitudinally of the table 20 that the vertical center scale line 163 of the CRT 162 passes through the flaw 152, or other point of interest, as shown in FIG. 15. If the Y-coordinate of the flaw 52, or other point of interest, is also needed this can be obtained by manually measuring such coordinate and entering it into the computer through the keyboard 160 of the operator's terminal 158.

If both X and Y coordinates of various flaw representing points in the system of FIG. 13 are required, the taking of such coordinates may be facilitated by providing the display device of the operator's terminal with a touch sensitive display surface or other display surface of the type whereby upon touching the display surface signals representing the coordinates of the touched point relative to the screen surface are produced and input to the computer. A terminal 158' with such a display surface is shown in FIG. 15*a* and may be substituted for the terminal 158 of FIG. 13. The terminal 158' has a CRT 162' providing the display surface in the form of a touch sensitive screen 165. The touch sensitive screen may be provided in any number of well known ways but in the illustrated case of FIG. 15A is comprised of a conventional glass base screen 167 covered with a transparent touch sensitive membrane 169. The membrane 169 may consist of a thin transparent sheet of plastic having embedded therein a grid of nearly invisibly thin X and Y wires which provide an output signal representing the X and Y coordinates, relative to the screen 162', of a point on the screen touched by a stylus 171.

In the use of the system of FIG. 13 equipped with the terminal 158' of FIG. 15A, when a flaw is detected on the top surface of the layup 22 the operator moves the vidicon 144 by means of the handle 150 to a position generally above the flaw. The encoder 148 provides a representation of the vidicon location along the X-coordinate direction relative to the table 20 to the computer and in response to this the computer may provide for the appearance on the screen 162' of the CRT an image of that portion of the marker lying in the vicinity of the vidicon location, such image being such as represented by the pattern pieces 164, 164 of FIG. 15A.

With further regard to the use of the system of FIG. 13 equipped with the terminal 158' of FIG. 15A, after the vidicon 144 is moved to the position generally above the flaw an image of the area of the top surface of the layup 22 in the vicinity of the flaw is displayed on the screen 165 of the CRT 162', and since the flaw is within the field of view of the vidicon an image of it, indicated at 173 in FIG. 15A, will also appear on the screen 165. Then, to input to the computer information concerning points representing the flaw 173 the stylus 171 may be touched to the screen 162' at such points. The number of points taken to represent a flaw may vary depending on the nature of the flaw and the processing capacity of the computer, but in FIG. 15A for the illustrated flaw 173 eight such points are shown at 175, 175. To input the coordinates of all eight of these points 175, 175 therefore, all the operator need do is to merely touch the stylus 171 to the screen at the points 175, 175 in succession. The coordinates of these points are then combined with the position of the vidicon 144 derived from the encoder 148 and the computer than processes this information along with the marker representation stored in the memory of the controller 30 to provide an indication of proper corrective action. The information may then be displayed on the screen 165 of the CRT 162' or by some other visual display device. Although FIG. 15A shows an image of the related portion of the marker superimposed in the flaw image 173 provided by the vidison this may not be needed in all cases, it being possible in some cases to omit the showing of the marker image.

Figure 16:
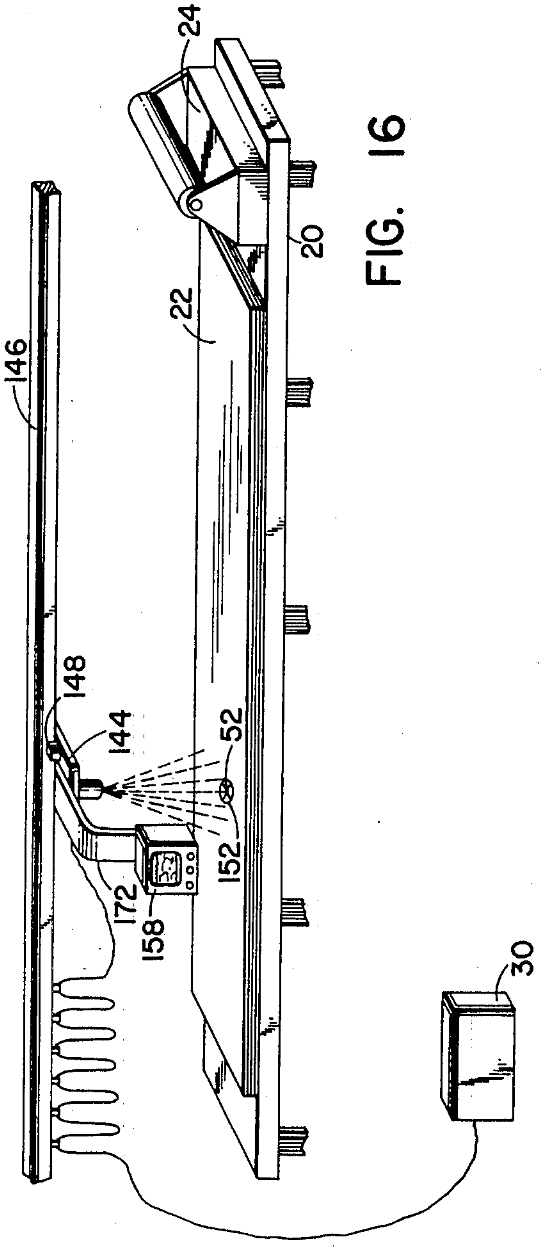
FIG. 16 is a perspective view, somewhat diagrammatic, showing a spreading table associated with a flaw handling system comprising another embodiment of this invention.
Figure 17:
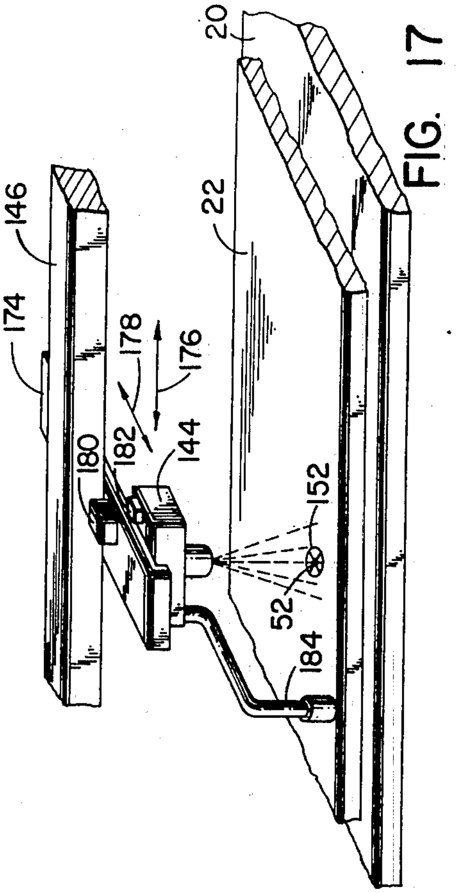
FIG. 17 is a fragmentary perspective view showing a spreading table associated with a vidicon arrangement which may be substituted for that of FIG. 13.
Figure 18:
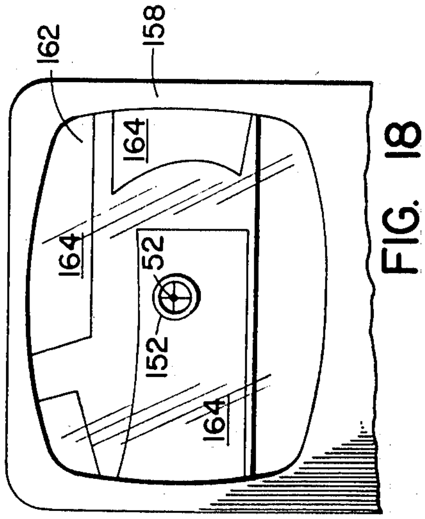
FIG. 18 is a view showing a typical visual display produced by a system using the vidicon arrangement of FIG. 17.

In FIG. 13, the operator's terminal 158 is separate from the vidicon 144 and may, as illustrated, be placed on a wheeled cart 170, movable to a location convenient to the operator. Another arrangment for the operator's terminal 158, is shown in FIG. 16, wherein it is carried by a support 172, also carrying the vidicon 144, for movement in the X-coordinate direction longitudinally of the table 20. Therefore, in the FIG. 16 arrangement, when the vidicon is moved to a position above a detected flaw 52 the CRT is at the same time brought to a convenient location for use by the operator. In the systems of FIG. 13 and FIG. 16, the vidicon 144 is movable only in the X-coordinate direction or longitudinally of the table 20, and it is assumed that the related field of view is sufficient to encompass the entire width of the layup 20. If a smaller field of view is desired, the vidicon 144 may be supported for movement in two coordinate directions, as shown for example in FIG. 17. That is, the vidicon 144 of FIG. 17 is supported by a carriage 174 supported by the rail 146 for movement longitudinally of the table 20, as indicated by the arrow 176, with the vidicon in turn being supported for movement relative to the carriage 174 in the direction transversely of the table 20, as indicated by the arrow 178. The longitudinal position of the carriage 174 is encoded by an encoder 180 fixed to the carriage and the transverse position of the vidicon is encoded by another encoder 182 attached to the vidicon. A handle 184, attached to the vidicon 144, may be used by the operator to move the vidicon both longitudinally and transversely of the table 20 to bring it to a position directly or substantially directly above the detected flaw 52. The field of view of the vidicon 144 may be chosen to suit the operator's needs, but if desired, may be a relatively small one as shown in FIG. 18. If the vidicon is located directly above the detected flaw so that its optical axis coincides with the detected flaw, the detected flaw will appear in the middle of the CRT screen, but such precise location of the vidicon relative to the detected flaw is generally not necessary if it is to be left to the operator to decide on the corrective action to be taken.

Figure 19:
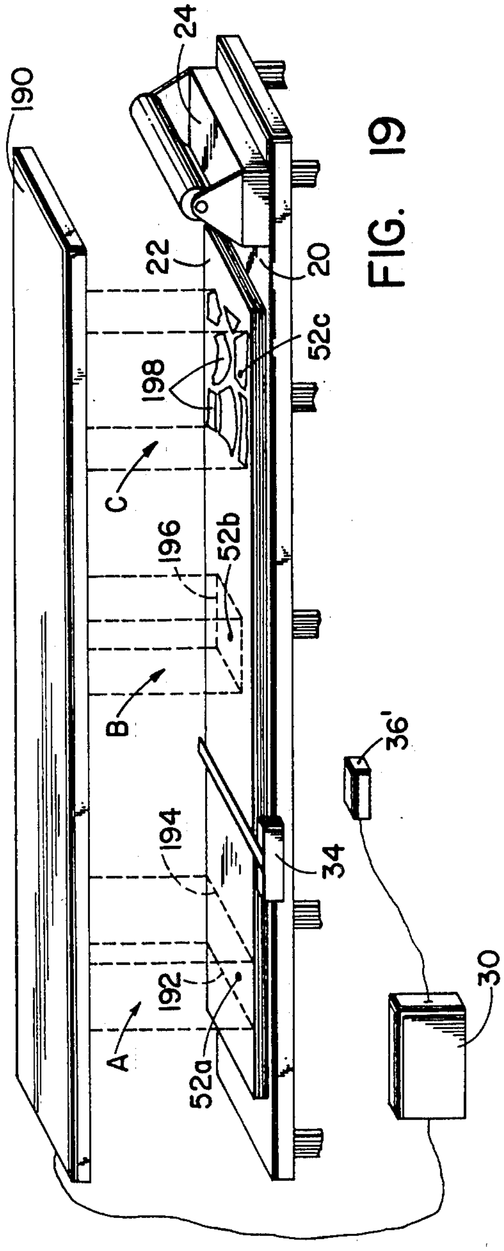
FIG. 19 is a perspective view, somewhat diagrammatic, showing a spreading table associated with a flaw handling system comprising another embodiment of this invention.

Instead of a pictorial display being generated on a separate area such as the screen of a CRT tube, it may be made by projecting it directly onto the surface of the material being spread. Such an arrangement is shown in FIG. 19 wherein the system is similar to that shown in FIG. 1, except for the visual display instead of appearing on the operator's terminal 36′, is obtained through the use of a projecting panel 190 located above the table 20. The lower surface of the panel 190 contains a very large number of collimated light sources, such as miniature lasers, arranged in rows and columns, such as the arrangement of the LED's 138, 138 of FIG. 12 which may be turned on or off and each of which, when turned on, projects a corresponding spot of light onto the surface of the layup 22. Therefore, the computer of the controller 30 processes the flaw location information and the marker representation to derive information in such form as to turn on appropriate light sources of the panel 190 to cause the projection onto the surface of the layup of the information useful to the operator. For example, as shown generally at A in FIG. 19, the projected information may be the projection of spots to create on the top surface of the layup a stop line 192 and a restart line 194 for use in making a splice. Or, as indicated generally at B, the projected information may be such as to define a shape 196 showing the outline of a patch to be applied to the material. Or, as shown generally at C, the projected information may be such as to define images 198, 198 of the pattern pieces of the marker located in the vicinity of the detected flaw 52*c*.

In FIG. 19, the panel 190 is shown to be stationary and of a length equal to the length of the layup 22. However, the panel 190 could also be made of a substantially shorter length and be made movable in the longitudinal direction of the table 20.

Figure 20:
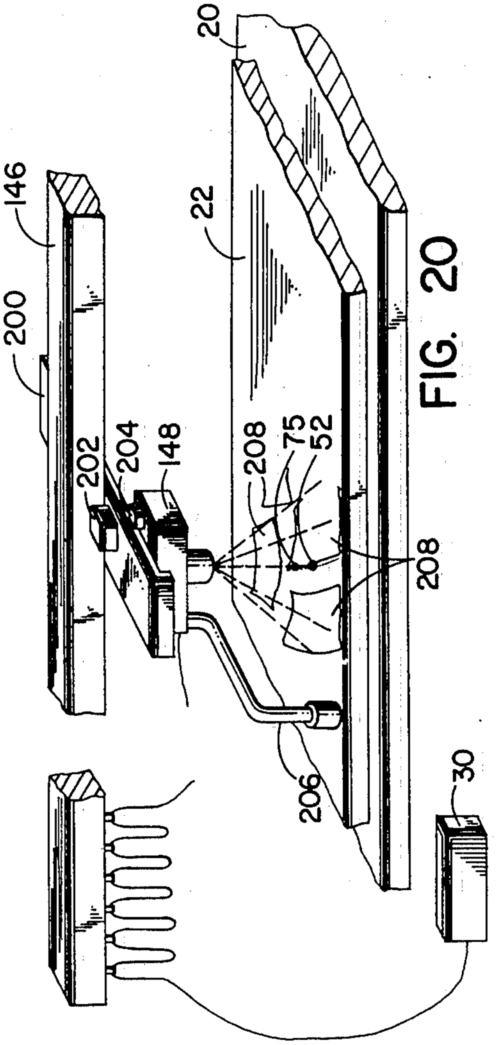
FIG. 20 is a perspective fragmentary view, somewhat diagrammatic, of a spreading table associated with a flaw handling system comprising still another embodiment of this invention.

Another system for projecting the displayed information directly onto the layup 22 is shown in FIG. 20. In this system, the projector projects onto the web material a spot or other image defining its location relative to the web as well as an image of that portion of the marker in the neighborhood of such spot. The projector may take various forms, such as one having a galvanometer deflected laser beam, and in FIG. 20 is taken to be a projection television unit 148 supported for movement transversely and longitudinally of the table 20 by a carriage 200 supported by the rail 146 for movement longitudinally of the table and which carriage in turn supports the projection TV unit 148 for movement in the transverse direction. The longitudinal position of the unit 148 is encoded by an encoder 202, while its transverse position is encoded by another encoder 204. In use, the projection TV unit 148 is moved above a detected flaw 52 by the operator, using a handle 206 fixed to the unit until its projected spot 75 coincides with the flaw 52 (or with some other point whose coordinates are to be read as part of the flaw locating information). The encoders 202, 204 then supply the coordindates of the unit 148 to the computer of the controller 30 as a flaw location representation. Processing this information in conjunction with the stored marker representation, the computer then supplies to the projection TV unit 148 signals causing it to project onto the surface of the marker 22 images of the pattern pieces 208, 208 located in the neighborhood of the flaw 52. From the display thus created, the operator can determine whether the flaw falls at an acceptable or unacceptable spot and can decide on what action to take to correct for the flaw, if such correction is necessary. Alternatively, the computer can be programmed to determine itself the acceptable or unacceptable nature of the flaw, and/or if the flaw is unacceptable, to determine and display the optimal way of dealing with the flaw.

We claim:

1. A system for assisting an operator in dealing with flaws encountered during the spreading of web material to be thereafter cut in accordance with a predetermined marker, said system comprising a spreading table for receiving web material spread thereon, a means providing a representation of the marker in accordance with which the material spread on said spreading table is to be cut, said means including a computer memory which said marker representation is stored, a means providing a representation of the location of a flaw appearing on the web material spread on said spreading table, and a visual display means responsive to both said marker representation and said flaw location representation providing a visual display useful to an operator in dealing with a flaw whose location is represented by said flaw location representation, said visual display means responsive to both said marker representation and said flaw location representation including a computer which processes said representation to provide the information displayed by said visual display means.

2. A system for assisting an operator in dealing with flaws encountered during the spreading of web material to be thereafter cut in accordance with a predetermined marker, said system comprising a spreading table for receiving web material spread thereon, a means providing a representation of the marker in accordance with which the material spread on said spreading table is to be cut, said means including a computer memory in which said marker representation is stored, a means providing a representation of the location of a flaw appearing on the web material spread on said spreading table, and a visual display means responsive both said marker representation and said flaw location representation providing a visual display useful to an operator in dealing with a flaw whose location is represented by said flaw location representation, said visual display means responsive to both said marker representation and said flaw location representation including a computer which processes said representations to provide the information displayed by said visual display means, and said computer being programmed to generate a closed line around said flaw location representation to create a flaw zone and to compare such flaw zone with the marker representation.

3. A system as defined in claim 2 further characterized by said marker representation being stored in a memory associated with said computer.

4. A system as defined in claim 1 further characterized by said computer being programmed to provide information for said visual display means concerning the dimensions and location of a patch to be applied to said web material.

5. A system as defined in claim 4 further characterized by said concerning the dimensions and location of said patch and said visual display means being such that such visual display means displays digits representing the patch dimensions and digits representing the coordinates of the patch location.

6. A system as defined in claim 4 further characterized by said information concerning the dimensions and location of said patch and said visual display being such that said visual display displays a shape related to that of the required patch.

7. A system as defined in claim 6 further characterized by said visual display means having a flat two-dimensional display surface and a plurality of two state areas distributed over such surface which may be switched between their two states to create said display of a shape related to that of the required patch.

8. A system as defined in claim 7 further characterized by each of said two state areas being one having a first light emitting state and a second a non-light emitting state.

9. A system as defined in claim 4 further characterized by said visual display means being a cathode ray tube.

10. A system as defined in claim 4 further characterized by said visual display means being a light projecting means located above said spreading table which projecting means projects light onto the web material spread on said spreading table to create said visual display.

11. A system for assisting an operator in dealing with flaws encountered during the spreading of web material to be thereafter cut in accordance with a predetermined marker, said system comprising a spreading table for receiving web material spread thereon, a means providing a representation of the marker in accordance with which the material spread on said spreading table is to be cut, said means including a computer memory in which said marker representation is stored, a means providing a representation of the location of a flaw appearing on the web material spread on said spreading table, and a visual display means responsive to both said marker representation and said flaw location representation providing a visual display useful to an operator in dealing with a flaw whose location is represented by said flaw location representation, said visual display means responsive to both said marker representation and said flaw location representation including a computer which processes said representations to provide the information displayed by said visual display means, and said computer being programmed to process said marker representation and said flaw location representation to provide information converning the location of a transverse stop line at which the spreading of said web material is to be stopped and concerning the location of another transverse restart line from which the spreading of said web material is to be restarted in making a splice in the web material to deal with the flaw whose location is represented by said flaw location representation.

12. A system as defined in claim 11 further characterized by said information provided by said computer and said visual display means being such that said visual display means displays digits representing the location of said stop and restart lines.

13. A system as defined in claim 11 further characterized by said visual display means being a flat two-dimensional display pictorially displaying the flaw whose location is represented by said flaw location representation and also displaying two lines representing said cut and restart lines.

14. A system as defined in claim 11 further characterized by said visual display means being a cathode ray tube.

15. A system as defined in claim 11 further characterized by said visual display means being a light projecting means located above said spreading table which projecting means projects light onto the web material spread on said table to create said visual display.

16. A system as defined in claim 1 further characterized by said means providing said flaw location representation including a manual measuring device and a keyboard for entering into the remainder of said system measurements made with said manual measuring device, which measurements are processed by said computer along with said marker representation to provide information displayed by said visual display means.

17. A system as defined in claim 16 further characterized by said manual measuring device being a T-square adapted for use with said spreading table for measuring the coordinate of a flaw along a coordinate axis (Y axis) extending transversely of said spreading table.

18. A system as defined in claim 16 characterized by said manual measuring device being a scale extending along the length of said spreading table for use in measuring the coordinate of a flaw along a coordinate axis (X axis) extending longitudinally of said spreading table.

19. A system as defined in claim 16 further characterized by said manual measuring device being a T-square adapted for use with said spreading table for measuring the coordinate of a flaw along a coordinate axis (Y axis) extending transversely of said spreading table and, and said keyboard being fixed to said T-square.

20. A system as defined in claim 19 further characterized by said visual display means including a visual display output device fixed to said T-square.

21. A system as defined in claim 1 further characterized by said means providing said flaw location representation including a manually positioned pointer movable in two coordinate directions relative to said web material spread on said spreading table, and two coordinate encoders for encoding the two coordinates of said pointer location and the outputs of which encoder are processed by said computer along with said marker representaion to provide information displayed by said visual means.

22. A system for assisting an operator in dealing with flaws encountered during the spreading of web material to be thereafter cut in accordance with a predetermined marker, said system comprising a spreading table for receiving web material spread thereon, a means providing a representation of the marker in accordance with which the material spread on said spreading table is to be cut, said means including a computer memory in which said marker representation is stored, a means providing a representation of the location of a flaw appearing on the web material spread on said spreading table, and a visual display means responsive to both said marker representation and said flaw location representation providing a visual display useful to an operator in dealing with a flaw whose location is represented by said flaw location representation, said means providing a flaw location representation including a T-square, said T-square including a head engageable with one longitudinal side edge of said table and an elongated arm fixed to said head which arm extends transversely of said table when said head is in flat engagement with said one side edge of said spreading table, and a pointer carried by said T-square arm and slidable along the length thereof, a first encoder connected with said T-square head for encoding the position of said T-square along the length of said spreading table, and a second encoder carried by said T-square and connected with said pointer for encoding the position of said pointer along the length of said T-square arm.

23. A system as defined in claim 22 further characterized by a keyboard fixed to said T-square head.

24. A system as defined in claim 23 further characterized by said visual display means including a visual display output device fixed to said T-square head.

25. A system as defined in claim 1 further characterized by said means providing said flaw location representation including a vidicon located above said spreading table and viewing a portion of the web material spread on said table.

26. A system as defined in claim 25 further characterized by means supporting said vidicon for movement relative to said spreading table in the longitudinal direction of said table and an encoder for encoding the position of said vidicon in said longitudinal direction of said table.

27. A system as defined in claim 26 further characterized by a handle for manually moving said vidicon longitudinally of said spreading table.

28. A system as defined in claim 26 further characterized by means supporting said vidicon for movement in the direction extending transversely of said spreading table and a second encoder for encoding the position of said vidicon in said transverse direction.

29. A system as defined in claim 28 further characterized by a handle for manually moving said vidicon in said longitudinal and transverse coordinate directions.

30. A system as defined in claim 26 further characterized by said visual display means being a cathode ray tube showing the area of said web material viewed by said vidicon and also showing superimposed on such area the related portion of said marker.

31. A system as defined in claim 30 further characterized by means supporting said cathode ray tube for movement with said vidicon.

32. A system as defined in claim 30 further characterized by said cathode ray tube showing the full transverse extent of the web material spread on said spreading table in the area viewed by said vidicon.

33. A system as defined in claim 1 further characterized by said visual display means including a projector located above said spreading table which projector projects onto the web material spread on the spreading table a portion of said marker corresponding to the location of said projector relative to the material spread on said spreading table.

34. A system as defined in claim 33 further characterized by means supporting said projector for movement in the coordinate direction extending longitudinally of said cutting table.

35. A system as defined in claim 33 further characterized by said projector being movable in a first coordinate direction extending longitudinally of said cutting table and in a second coordinate direction extending transversely of said cutting table.

36. A system as defined in claim 35 further characterized by a handle for manually moving said projector in said first and second coordinate directions.

37. A system as defined in claim 35 further characterized by first and second encoders associated with said projector for encoding its coordinate positions along said first and second coordinate directions and said information provided to said projector and said projector being such that included in the picture projected by said projector onto said web material is a spot representing the position of said projector as encoded by said first and second encoders.

38. A system for assisting an operator in dealing with flaws encountered during the spreading of web material to be thereafter cut in accordance with a predetermined marker, said system comprising a spreading table for receiving web material spread thereon, a means providing a representation of the marker in accordance with which the material spread on said spreading table is to be cut, said means including a computer memory in which said marker representation is stored, a means providing a representation of the location of a flaw appearing on the web material spread on said spreading table, and a visual display means responsive to both said marker representation and said flaw location representation providing a visual display useful to an operator in dealing with a flaw whose location is represented by said flaw location representation, said means providing said flaw location representation including a vidicon located above said spreading table and viewing a portion of the web material spread on said table, and said means responsive to both said marker representation and said flaw location representation including a computer which processes said representations to provide the information displayed by said visual display means, said visual display being one including a display surface on which is shown an image of said web material as viewed by said vidicon, said display surface having a coordinate encoding means associated with it whereby upon touching said display surface signals representing the coordinates of the touched point relative to the display surface are input to said computer as part of said flaw location representation;

39. A system as defined in claim 38 further characterized by said visual display being a cathode ray tube with a touch sensitive screen.

40. A system as defined in claim 38 further characterized by means for enabling said display surface of said visual display to also show, superimposed on the image of the web as viewed by said vidicon, an image of the related portion of said marker.

41. A system as defined in claim 40 further characterized by said visual display being a cathode ray tube with a touch sensitive screen.

42. A system as defined in claim 38 further characterized by said visual display being a cathode ray tube having a base screen providing said display surface, and said display surface coordinate encoding means being a transparent membrane covering said screen and a stylus, said membrane and stylus cooperating with one another so that when said stylus is touched to said membrane signals representing the coordinates of the points on said membrane by said stylus are supplied to said computer as part of said flaw location representation.

43. A system as defined in claim 38 further characterized by said vidicon being movable in at least one coordinate direction relative to said spreading table to enable a flaw on the top surface of the web material spread on said table to be brought into the field of view of said vidicon, and means for encoding the position of said vidicon relative to said table in said at least one coordinate direction and for inputting the output of said encoding means to said computer as another part of said flaw location representation.

44. A system for spreading web material and thereafter cutting it in accordance with a predetermined marker representation resident in a computer memory and which system includes means for assisting an operator in dealing with flaws encountered during the spreading of the web material, said system comprising a table for receiving web material spread thereon, a means providing a representation of a marker in accordance with which the material spread on said table is to be cut, said means including a computer memory in which said marker representation is stored, a means providing a representation of the location of a flaw appearing on the web material spread on said table, a visual display means providing a visual display useful to an operator in dealing with a flaw whose location is represented by said flaw location representation, a cutter, and means for causing said cutter to automatically cut said material in accordance with said marker representation, said visual display means including a visual display output device and a computer, said computer serving to process said marker representation along with said flaw location representation to produce information supplied to said visual display output device to create said visual display.

45. A system as defined in claim 44 further characterized by said means for causing said cutter to autmotically cut said material in accordance with said marker representation including a computer which processes said marker representation to control said cutter.

46. A system as defined in claim 45 further characterized by said computer which processes said representations to produce the information supplied to said visual display output device and the computer which processes said marker representation to control said cutter being one and the same computer.

* * * * *